US006526628B1

(12) United States Patent  
Caveney et al.

(10) Patent No.: US 6,526,628 B1
(45) Date of Patent: Mar. 4, 2003

(54) LOW THREAD FORCE CABLE TIE WITH LOCKING DEVICE THAT PIERCES STRAP

(75) Inventors: Jack E. Caveney, Hinsdale; Robert J. Krisel, Oak Forest; James A. Brownlee, Park Forest, all of IL (US)

(73) Assignee: Panduit Corp., Tinley Park, IL (US)

( * ) Notice: Subject to any disclaimer, the term of this patent is extended or adjusted under 35 U.S.C. 154(b) by 18 days.

(21) Appl. No.: 09/855,383

(22) Filed: May 15, 2001

(51) Int. Cl.$^7$ .......................... B65D 63/14; F16L 33/00
(52) U.S. Cl. ................. 24/16 PB; 24/17 AP; 24/30.5 P
(58) Field of Search .......................... 24/16 PB, 17 AP, 24/30.5 P, 30.5 R; 248/74.3; 292/318

(56) References Cited

U.S. PATENT DOCUMENTS

| | | |
|---|---|---|
| 3,186,047 A | 6/1965 | Schwester et al. |
| 3,408,699 A | 11/1968 | Reynolds |
| 3,457,598 A | 7/1969 | Mariani |
| 3,486,200 A | 12/1969 | Orenick |
| 3,488,813 A | 1/1970 | Kohke |
| 3,490,104 A | 1/1970 | Kabel |
| 4,875,647 A | 10/1989 | Takagi et al. |
| 5,193,251 A | 3/1993 | Fortsch |
| 5,317,787 A | 6/1994 | Fortsch |
| 5,513,421 A * | 5/1996 | Wells .................. 24/16 PB |
| 5,517,727 A | 5/1996 | Bernard et al. |
| 5,517,728 A | 5/1996 | Woods |
| D372,665 S | 8/1996 | Kim |
| 5,621,949 A * | 4/1997 | Wells et al. ........... 24/16 PB |
| 5,630,252 A | 5/1997 | Wells |
| 5,774,944 A | 7/1998 | Choi |
| 5,781,975 A | 7/1998 | Wells, Jr. et al. |
| 5,815,891 A | 10/1998 | Students et al. |
| 5,881,435 A * | 3/1999 | Jermyn, Jr. ............ 24/16 PB |
| 5,890,265 A | 4/1999 | Christian et al. |
| 6,076,234 A | 6/2000 | Khokhar et al. |
| 6,279,203 B1 * | 8/2001 | Hundley et al. ....... 24/16 PB |

FOREIGN PATENT DOCUMENTS

WO  9506601 * 3/1995 ............... 24/16 PB

* cited by examiner

*Primary Examiner*—Victor Sakran
(74) *Attorney, Agent, or Firm*—Robert A. McCann; Jay A. Saltzman; Christopher S. Claney

(57) ABSTRACT

A two piece cable tie is provided having an improved locking device support. The cable tie includes a strap with a first end and a free end, a locking head having a strap accepting channel, and a metal locking device mounted within an anchoring housing region of the head to form a cantilever beam having a mounted end fixed to a support of the locking head and a free end positioned within the strap accepting channel. The strap includes a central inwardly projecting groove of a predefined width that defines a thinned portion extending along a longitudinal axis of the strap to the free end of the strap. The strap accepting channel has a channel width $W_1$ defined between an end wall and the inner wall. The strap accepting channel also includes a support guide projecting from the inner wall of the locking head into the strap accepting channel to restrict the width of the channel accepting channel to a width $W_2$, which is less than $W_1$. The free end of the metal locking device has a length L that is greater than $W_2$ and preferably no greater than $W_1$. The support guide has a width transverse to the width of the strap accepting channel that is less than the predefined width of the projecting groove of the strap. The support guide also includes a ledge that provides a support surface for the metal locking device that changes the locking device from one having a cantilever support to one with a simple beam support when the locking device is bent downward by a sufficient withdrawal force. This withdrawal force is sufficient to cause the locking device to fully pierce the thinned portion of the strap, which allows the free end of the locking device to rest upon the ledge. The strap may include a V-shaped groove at the first end to improve flexibility of the strap.

15 Claims, 7 Drawing Sheets

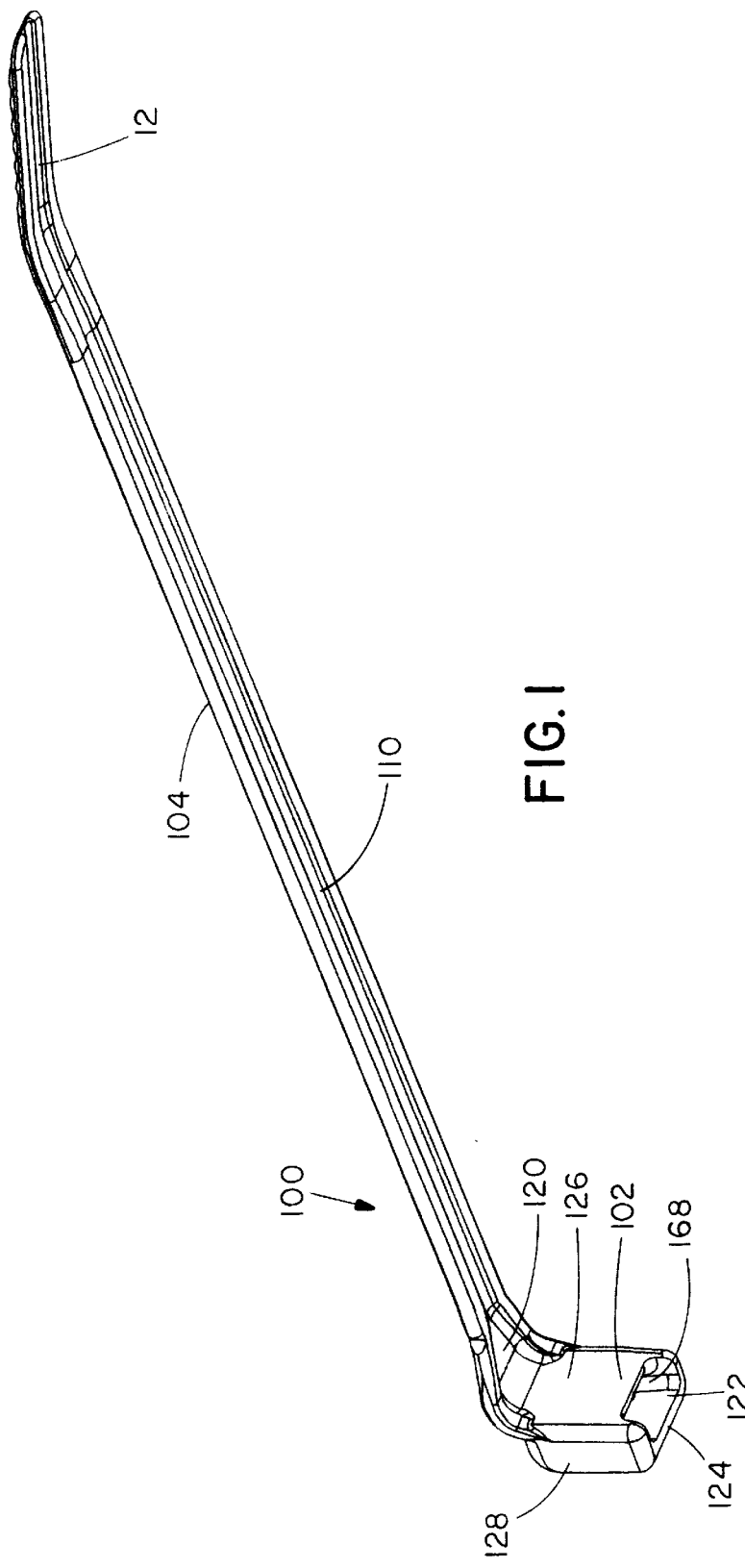
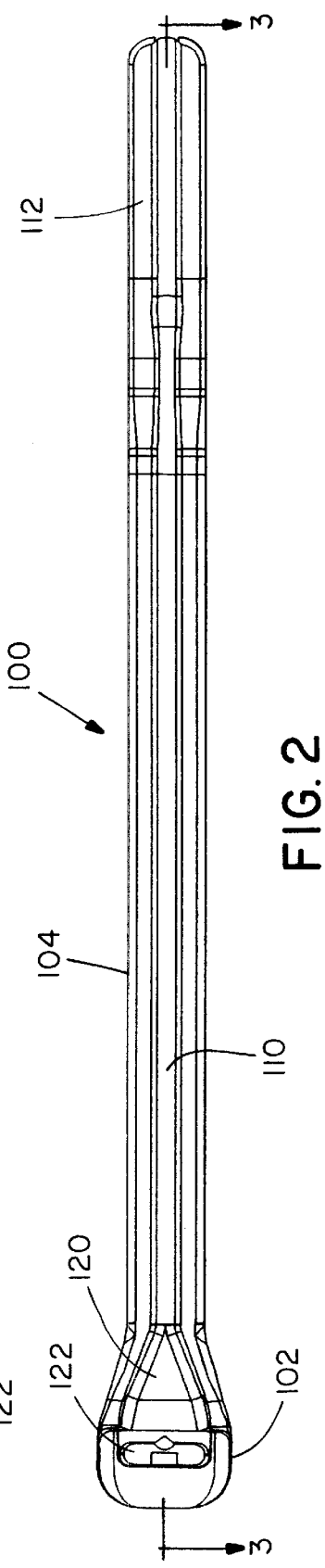

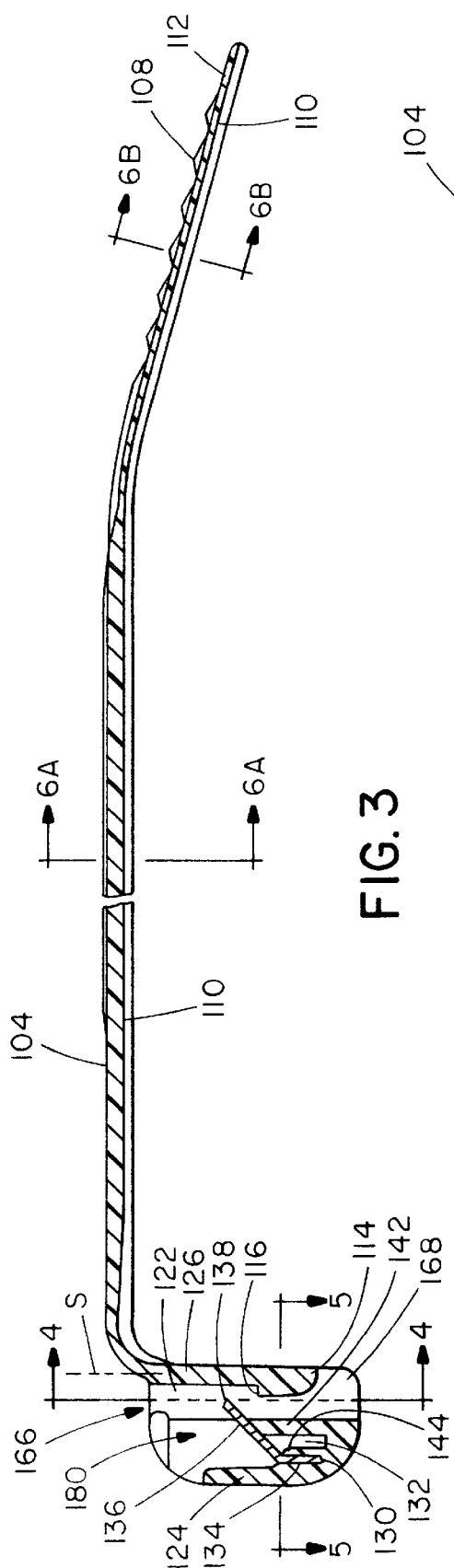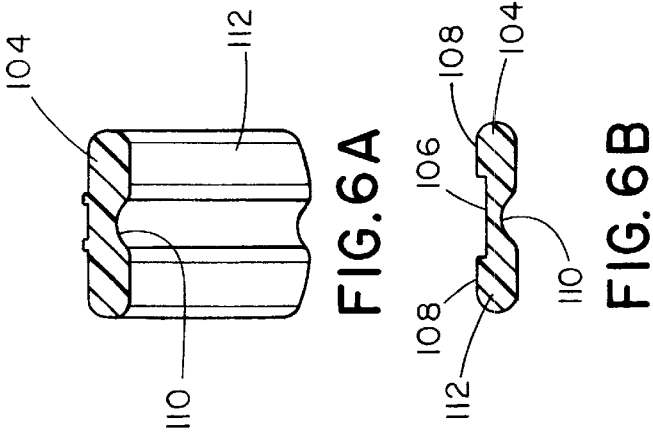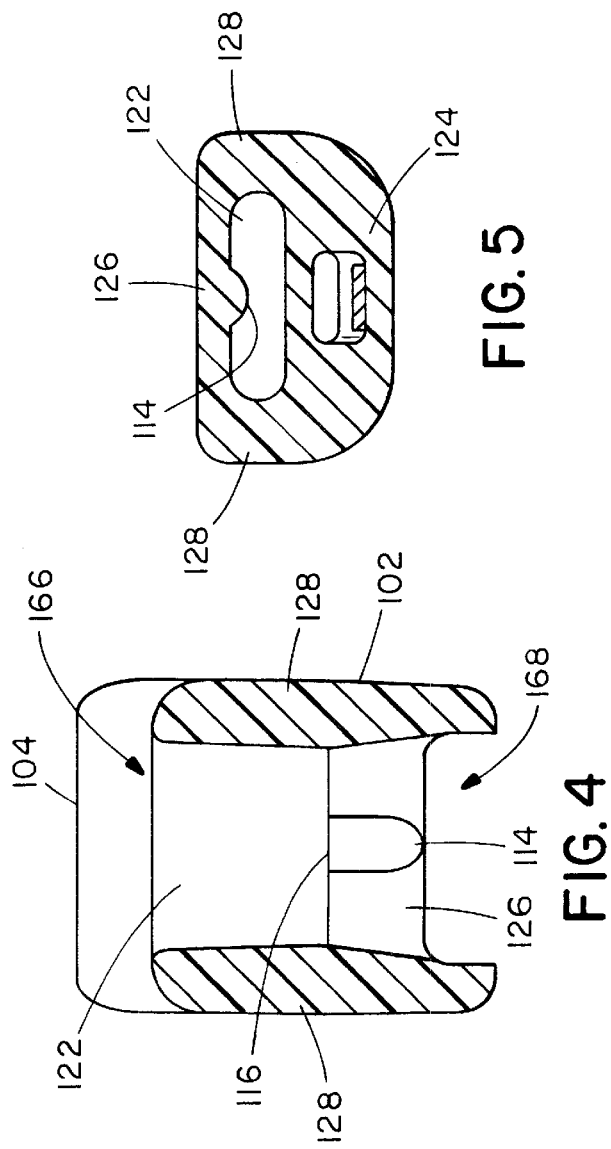

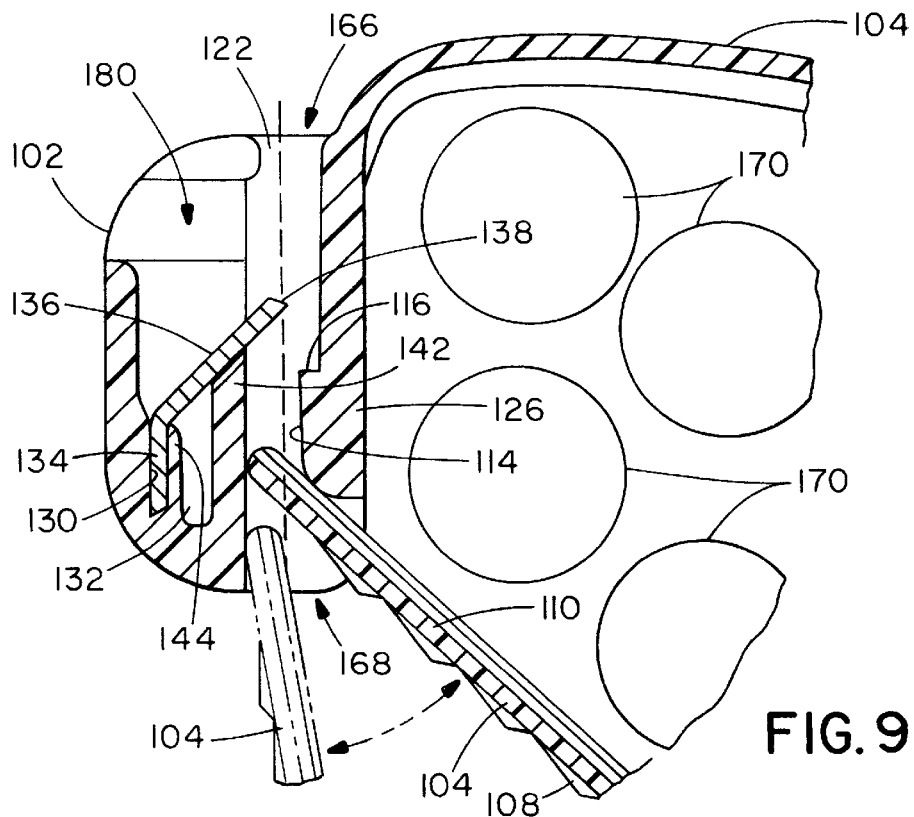
FIG. 9
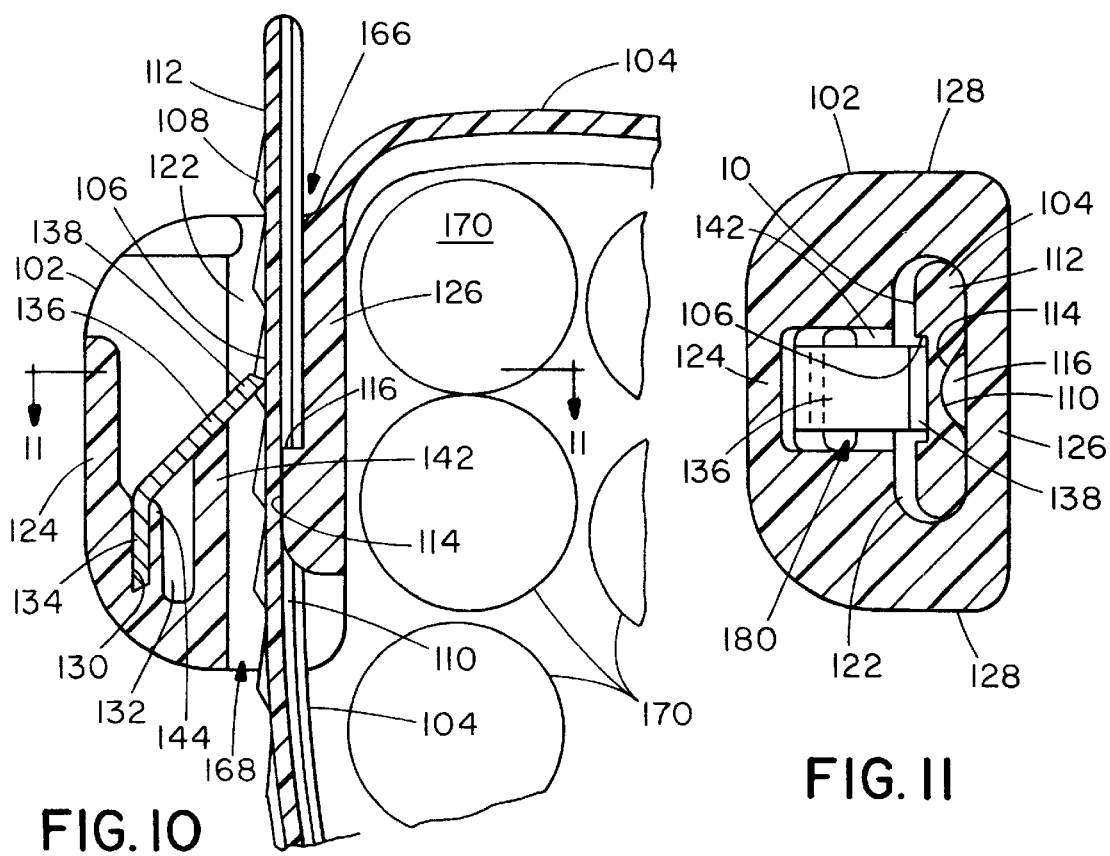
FIG. 10
FIG. 11

LOW THREAD FORCE CABLE TIE WITH LOCKING DEVICE THAT PIERCES STRAP

BACKGROUND OF THE INVENTION

1. Field of Invention

The present invention relates generally to a low thread force two piece cable tie with an improved locking structure. More particularly, a strap accepting channel is provided with a protruding support guide and the locking device is sized to be capable of filly piercing the strap so that a free end of the locking device is supported on the protruding support guide, which provides increased resistance to removal while achieving a lower insertion force.

2. Description of Related Art

Plastic cable ties having metal locking device inserts are well known in the art. Examples of such include U.S. Pat. No. 3,457,598 to Mariani and U.S. Pat. No. 5,517,727 to Bernard et al.

Cable ties of this type include a metal locking device partially embedded at an angle within a strap accepting channel of a cable tie head. The metal locking device is situated at an angle that allows insertion of a cable tie strap in an insertion direction, but allows for engagement of the locking device with the strap when it is pulled in a removing direction to prevent removal. The metal locking device of such conventional cable ties is in the form of a cantilevered beam that is fixed at one end and extends into the strap accepting channel at the free end.

It has always been a desirable feature to have a cable tie that is easy to use while maintaining its locking strength. To increase locking force, one option has been to increase the thickness of the locking device. However, this has been found to have an adverse affect on the insertion force necessary to install the cable tie, which is undesirable. The converse is also true, attempts to reduce insertion force have resulted in use of thinner metal locking devices, which while reducing insertion force have the undesirable affect of reducing the locking force of the cable tie.

Thus, there is a need for an improved locking device that can provide better resistance to removal while achieving a low insertion force.

There also is a need for an improved cable tie that has more flexibility of the cable tie strap, particularly near the locking head.

SUMMARY OF THE INVENTION

It is therefore an object of the invention to provide a cable tie utilizing a metal locking device that has improved retention strength and a low insertion force.

It is another object of the invention to provide a two piece cable tie with a locking device that converts from a cantilever beam to a simple beam support when fully engaged to increase resistance to cable tie removal.

It is another object of the invention to provide a two piece cable tie that has increased flexibility of the strap near the locking head without necessarily reducing or compromising strength of the cable tie.

The above and other objects are achieved by a cable tie comprising a strap including a first end and a free end, a locking head having a strap accepting channel, and a metal locking device mounted within an anchoring region of the head to form a cantilever beam having a mounted end fixed to an end wall of the locking head and a free end positioned within the strap accepting channel. The strap includes a central inwardly projecting groove of a predefined width that defines a thinned portion extending along a longitudinal axis of the strap to the free end of the strap. The strap accepting channel has a channel width $W_1$ defined between an end wall and the inner wall. The strap accepting channel also includes a support guide projecting from the inner wall of the locking head into the strap accepting channel to restrict the width of the channel accepting channel to a width $W_2$, which is less than $W_1$. The free end of the metal locking device has a length L that is greater than $W_2$. The support guide has a width transverse to the width of the strap accepting channel that is less than the predefined width of the projecting groove of the strap. The support guide also includes a ledge that provides a support surface for the metal locking device that changes the locking device from one having a cantilever support to one with a simple beam support when the locking device is bent downward by a sufficient withdrawal force. This withdrawal force is sufficient to cause the locking device to fully pierce the thinned portion of the strap, which allows the free end of the locking device to rest upon the ledge.

The invention also provides a method of bundling an object by: placing the cable tie around an object; inserting the free end of the strap into the strap entry end of the strap accepting channel and beyond the free end of the metal locking device; and feeding the free end of the strap through the strap accepting channel until the cable tie is snug around the object. The cable tie can be locked by applying a removal force to the cable tie acting to pull the strap out of the strap entry end of the strap accepting channel that causes deflection of the free end of the metal locking device toward the strap entry end of the strap accepting channel so as to fully pierce the strap and rest the free end of the metal locking device against the ledge of the support guide.

The invention also achieves increased cable tie strap flexibility by forming an end of the strap adjacent the locking head with a groove of increased width to provided a thinned portion that allows greater freedom of movement.

BRIEF DESCRIPTION OF THE DRAWINGS

The foregoing and further objects, features and advantages of the present invention will become apparent from the following description of preferred embodiments with reference to the accompanying drawings, wherein:

FIG. 1 is a bottom perspective view of a cable tie according to the present invention;

FIG. 2 is a bottom view of a cable tie according to the invention;

FIG. 3 is a cross-section view of the cable tie of FIG. 2 taken along line 3—3;

FIG. 4 is a cross-sectional view of a locking head of the cable tie of FIG. 3 taken along line 4—4;

FIG. 5 is a cross-sectional view of the locking head of FIG. 3 taken along line 5—5;

FIG. 6A is a cross-sectional view of a strap of the cable tie according to a first embodiment of the invention taken along line 6a—6a of FIG. 3;

FIG. 6B is a cross-sectional view of the free end of a strap of the cable tie according to a second embodiment of the invention taken along line 6b—6b of FIG. 3.

FIG. 9 is a cross-section view of the cable tie showing an initial feeding of the strap into a strap accepting channel;

FIG. 10 is a cross-sectional view of the cable tie showing an intermediate feeding position where a leading end of the strap has passed the locking device;

FIG. 11 is a cross-sectional view of the locking head and strap of FIG. 10 taken along line 11—11;

DETAILED DESCRIPTION OF PREFERRED EMBODIMENTS

Figure 7:
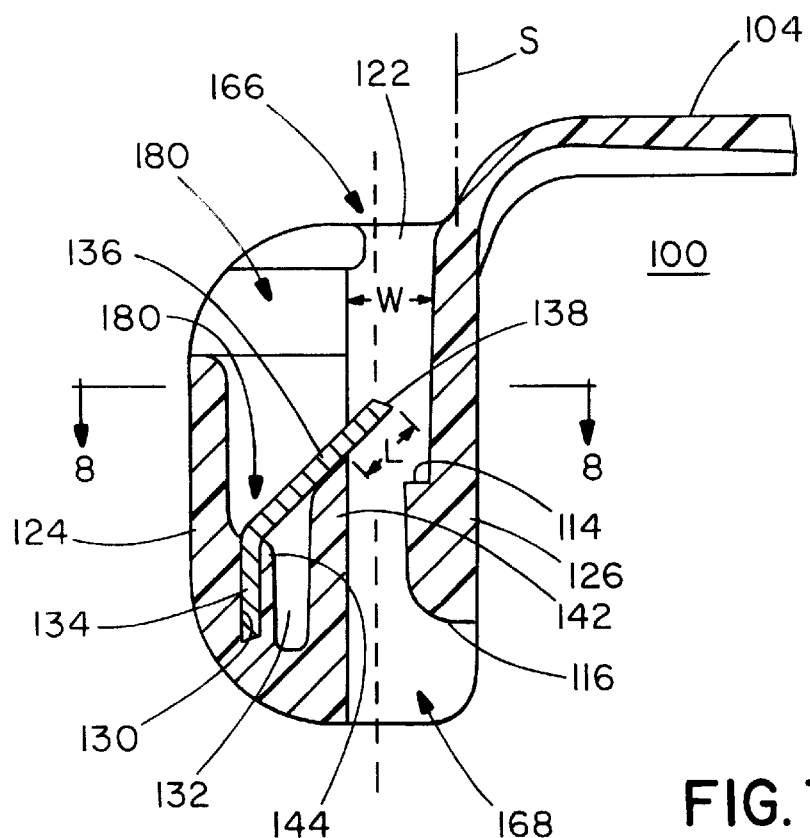
FIG. 7 is an enlarged view of the locking head of FIG. 3.

An inventive cable tie 100 will be described with reference to FIGS. 1–17. Cable tie 100 includes a locking head 102 and a strap 104. Cable tie 100 can be made from various materials as known in the art. Suitable materials include by way of example, nylon, polypropylene, and various fluoropolymers. Cable tie 100 can be formed in various sizes and lengths to suit a particular application as also known in the art. Obviously, desired loop tensile strength is one factor when selecting sizing of the strap, locking head and other components.

Strap 104 is provided with a longitudinally extending central groove 110 on the inside surface and optionally with a longitudinally extending central slot 106 on the outside surface of the leading end (see FIGS. 6A–B). Central groove 110 is preferably of a constant cross-section for a majority of the strap length. However, in a preferred embodiment, central groove 110 tapers at the end of the strap adjacent locking head 102 to form an increased width, such as by providing a V-groove 120 as best shown in FIGS. 1–2. Strap 104 also preferably includes standard gripping ridges 108 (see FIG. 3) on the outside surface of an angled and tapered leading end 112 of strap 104.

Figure 8:
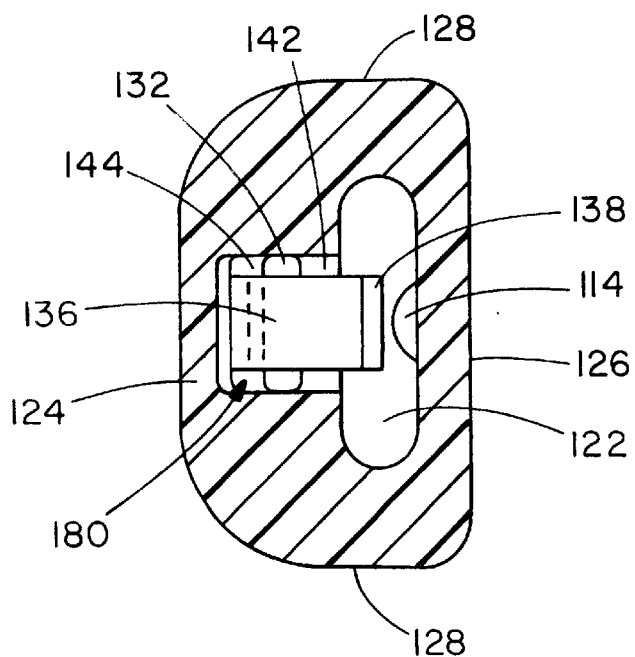
FIG. 8 is a cross-sectional view of the locking head of FIG. 7 taken along line 8—8.

Locking head 102 includes a strap accepting channel 122 and a locking device receiving cavity 180. Strap accepting channel 122 receives the leading end 112 of strap 104. Strap accepting channel 122 has a strap entry end 168 through which strap 104 is first inserted and a strap exit end 166 (see FIG. 3). As best shown in FIG. 5, strap accepting channel 122 is formed by an end wall 124, inner wall 126, and side walls 128 (see FIG. 5). As best shown in FIGS. 7–8, strap accepting channel 122 has a width $W_1$. A support guide 114 protrudes from inner wall 126 to define a reduced channel width $W_2$. Support guide 114 includes a ledge 116, the significance of which will be described later.

Metal locking device receiving cavity 180 is provided to allow access to an anchoring region on end wall 124, for partial embedding of metal locking device 136 in end wall 124 to define a cantilever beam structure having a fixed end 134 and a free end 138 that extends into strap accepting cavity 122. Metal locking device receiving cavity 180 also allows for movement of locking device 136. A support slot 130 is optionally preformed in the surface or else is inherently formed as a result of embedding fixed end 134 into the surface of end wall 124.

The metal locking device is preferably formed from a corrosion resistant metal such as stainless steel as known in the art. While metal locking device 136 may take a conventional straight form, it is preferably bent so that free end 138 is bent at a predetermined angle relative to fixed end 134. It is also preferable for the fixed end to be substantially parallel to the axis of strap accepting channel 122. In any case, free end 138 extends into the strap accepting channel at an acute angle relative to the axis of strap accepting channel 122 facing strap exit end 166.

Cantilevered metal locking device 136 has a fulcrum point defined at an upper edge 142 of end wall 124. Ledge 116 of support guide 114 extends substantially perpendicular to the strap accepting channel and is disposed across from the fulcrum point of metal locking device 136. While ledge 116 may be at the same elevation as upper edge 142 or slightly higher, ledge 116 is preferably slightly below upper edge 142 for reasons to be discussed later. Metal locking device 136 has a free length L defined from the fulcrum point to free end 138 is greater than width $W_2$. In preferred embodiments where ledge 116 is at or slightly below the level of upper edge 142, Length L preferably meets the criteria. $W_2 < L \leq W_1$. If L is greater than $W_1$ in this embodiment, free end 138 will contact inner wall 126 and may not reach ledge 116. However, a length of greater than $W_1$ can be used if contact with inner wall 126 is acceptable and in combination with ledge 116 still achieves supporting of both ends of metal locking device 136. Alternatively, a length L of greater than $W_1$ can be used when ledge 116 is located slightly above upper edge 142.

Central groove 110 on the inside surface and optionally central slot 106 on the outside surface form a reduced thickness portion for interacting with locking device 136. Central groove 110 straddles support guide 114 and may be used to align and guide strap 104 through strap accepting channel 122. To further assist in guidance with the least resistance, the leading end of support guide 114 may be tapered or arcuate as shown.

While cable tie 100 is shown to have a locking head with a strap accepting channel substantially parallel to a strap attachment axis S, which is shown for example in FIGS. 3 and 7 as being defined by the region where the strap attaches to the head, and also having a strap that is bent at approximately 90° from strap axis S, the cable tie is not limited to such a configuration and may take other forms. For example, the cable tie 100 may have a straight strap that continues to extend along strap attachment axis S. Additionally, cable tie 100 may have a more conventional right angle locking head such as that shown in Bernard '727, that has a strap accepting channel at a right angle to strap attachment axis S.

Use of the cable tie according to the invention will be described with reference to FIGS. 9–17. FIG. 9 shows initial insertion of leading end 112 of strap 104 into leading end 168 of strap accepting channel 122. As shown leading end 112 can be inserted over a broad range of entrance angles. Insertion continues as shown in FIGS. 10–11 while leading end 112 begins to extend beyond strap exit end 166 of strap accepting channel 122. At such time, a user may switch from pushing the strap through to pulling the strap through the strap accepting channel by now grasping leading end 112 and pulling. As best shown in FIG. 11, strap 104 is selfaligned in the strap accepting channel by the mating of central groove 110 around support guide 114.

Figure 12:
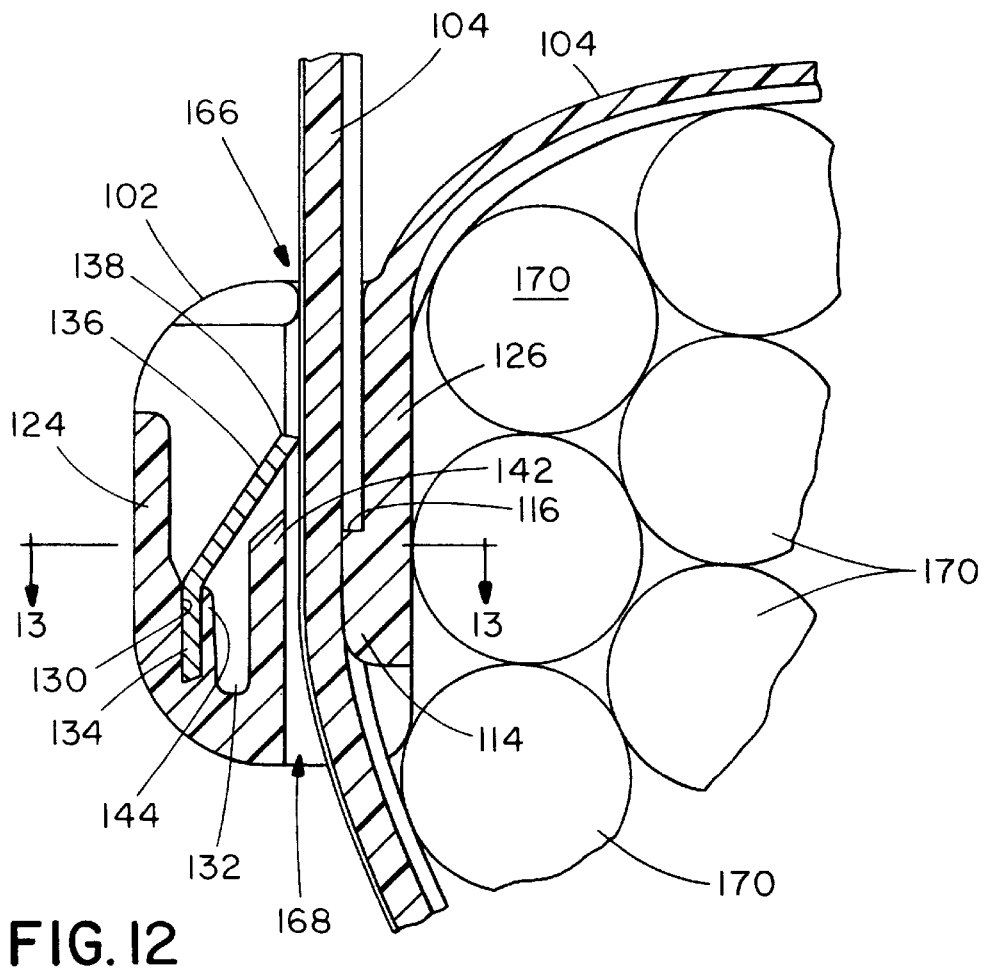
FIG. 12 is a cross-sectional view of the cable tie in a further feeding position where the strap is still being feed through the strap accepting channel in a feeding direction.
Figure 13:
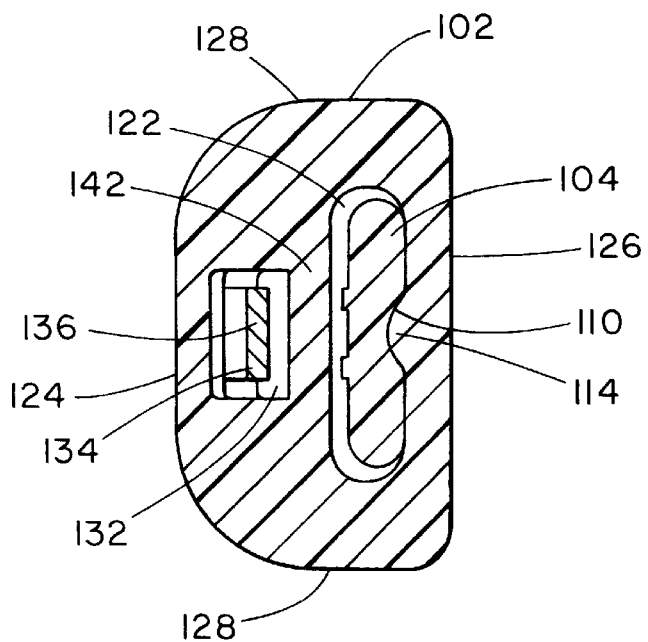
FIG. 13 is a cross-sectional view of the locking head and strap of FIG. 12 taken along line 13—13.
Figure 14:
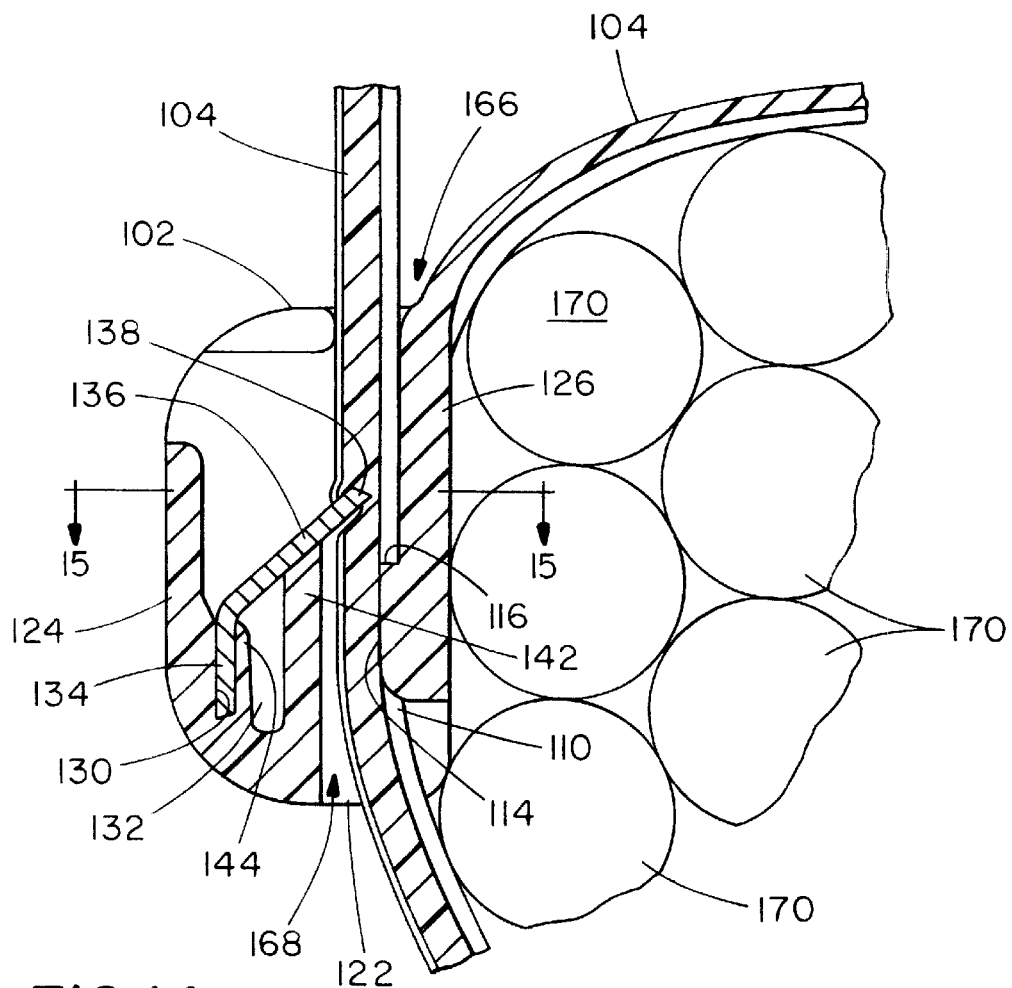
FIG. 14 is a cross-sectional view of the cable tie after the strap has been fully inserted and the strap has been partially retracted in a reverse direction, with the locking device being bent down and partially pierced into the strap to resist removal of the cable tie.
Figure 15:
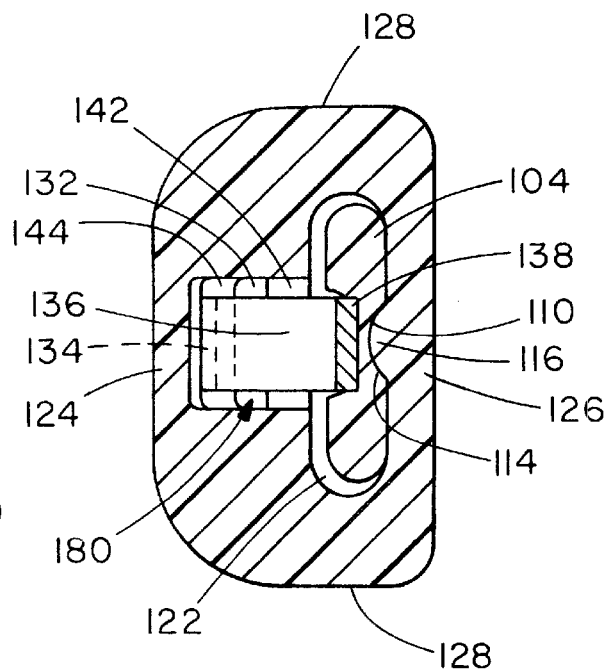
FIG. 15 is a cross-sectional view of the locking head and strap of FIG. 14 taken along line 15—15.

As shown in FIGS. 12–13, further tightening of the cable tie occurs until strap 104 is sufficiently tight around an object that is being constrained, such as cable bundle 170. During the insertion of the leading end 112 and the further tightening, free end 138 of metal locking device 136 flexes away from the cantilever fulcrum point 142 into metal locking device receiving cavity 180 due to resiliency of the metal and the cantilever design. However, for reasons to be discussed in more detail below, the thickness of the metal locking device 136 can be reduced from that of conventional designs for a particular application, which allows for a further reduction of cable insertion force.

Figure 16:
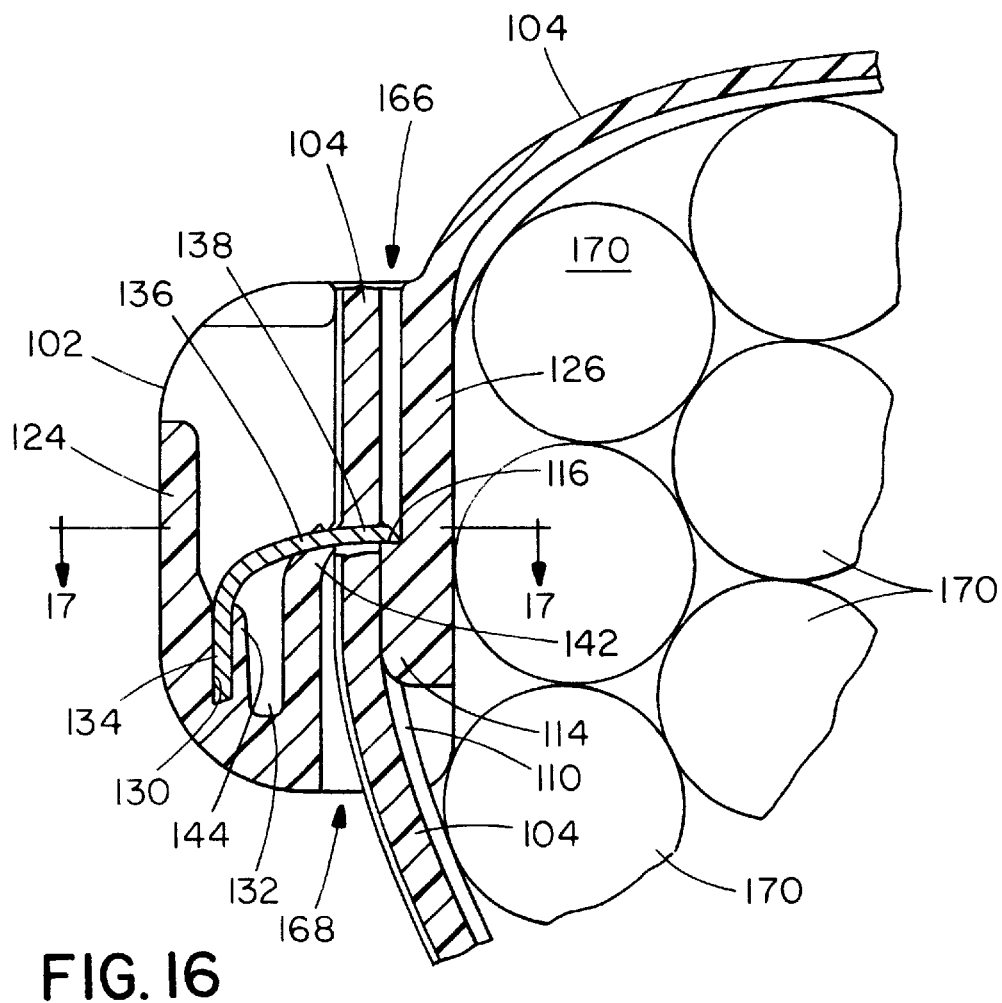
FIG. 16 is a cross-sectional view of the cable tie after the locking device has been fully bent so as to completely pierce the strap and have its leading free end supported on a ledge within the strap accepting channel.
Figure 17:
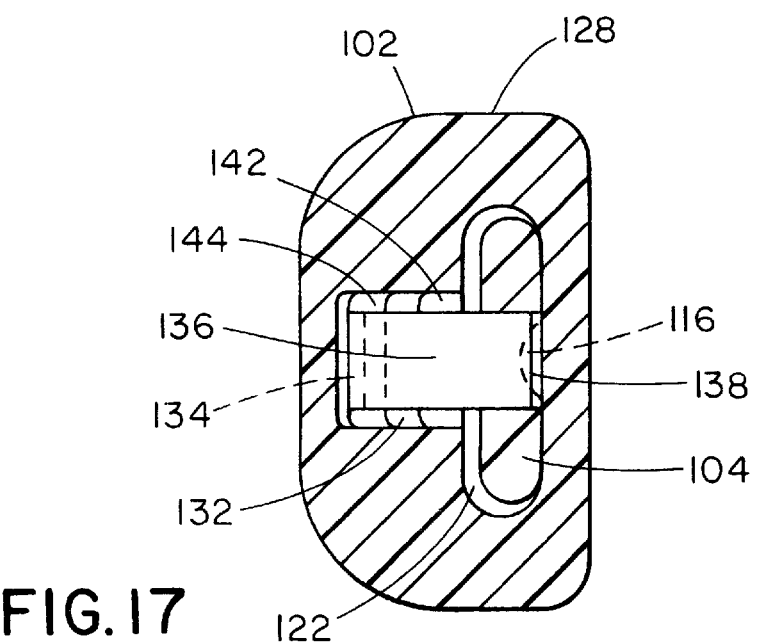
FIG. 17 is a cross-sectional view of the locking head and strap of FIG. 16 taken along line 17—17.

Upon release of the strap, or through application of a withdrawal force on the strap, a sharpened portion of free end 138 of the metal locking device 136 begins to pierce strap 104 as shown in FIG. 2 and free end 138 of metal locking device 136 flexes back against an end wall 124. Continued forces of sufficient strength will cause further deflection of free end 138 about fulcrum point 142 until eventually, locking device 136 fully pierces the reduced thickness portion of strap 104. While previously it was considered that full piercing of the strap is undesirable, it has been found that an increase in loop tensile strength can be achieved in such cases due to the provision of support guide 114 and ledge 116. That is, upon the full piercing of strap 104, free end 138 upon further bending will ultimately rest upon ledge 116 as shown in FIGS. 16–17. At this time, metal locking device 136 goes from a cantilever support with a free end 138 overhanging fulcrum point 142 to a simple beam structure in which both ends 134 and 138 are supported with support being provided at ledge 116 and at fulcrum point 142 by the upper edge of inner surface 124. As best shown in FIG. 16, deflection forces acting on free end 138 during locking of the metal locking device result in partial compression or deflection of the upper edge 142 of the fulcrum point. As such, it is preferable for the ledge 116 to be located slightly below the elevation of the upper edge in a non-locking state (such as in FIG. 9) so that when fully deflected, the fulcrum point 142 is substantially even with ledge 116 (such as in FIG. 16). With such a support structure, metal locking device 136 is capable of handling higher loads than that achieved using a simple cantilever structure. As such, achievable loop tensile strength can be increased for a given size metal locking device. Thus, for a desired loop strength, a reduced thickness metal locking device can be used, which has the added benefit of reducing cable insertion force.

In the embodiment shown in FIG. 16, length L of the free end 138 is greater than $W_2$ and less than or equal to $W_1$ to enable contact of the free end with the ledge. However, a length L of the free end 138 that is slightly greater than $W_1$ can also be used, such as by locating ledge 116 slightly above fulcrum point 142 so that the free end upon final resting becomes slightly angled upward, Alternatively, in a less preferred embodiment, the supporting of both ends of the metal locking device can still be achieved by a length L of greater than $W_1$ whereby the free end will also interfere with inner wall 126. However, this may not achieve the same holding force as achievable with ledge 116.

In many applications, maximum loop tensile strength will now be determined by properties of strap 104 rather than holding force of metal locking device 136. This strength will be determined by the force necessary to break the pierced portion of strap 104.

As a cable tie's loop tensile strength is only as strong as its weakest link, which is the point of full piercing of strap 104, other areas of the cable can have their strength reduced from a now overdesigned strength to a strength approaching that of the weak link so as to achieve other desirable benefits. One particular such area is the attachment area where the end of strap 104 attaches to locking head 102. If the central groove 110 were continued at the constant width, this end may be undesirably rigid. However, by increasing the width of the groove near the end, an increase of a reduced thickness area can be achieved which provides for increased flexibility of the cable strap at the attachment point. This is a desirable attribute that can be achieved at no cost in performance as long as the strength at this portion exceeds the weak link of the cable tie, It is preferable for such an end to have a V-groove shape 120 as shown in which the groove tapers.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

1. A cable tie, comprising:

a strap including a first end and a free end, the strap having a central inwardly projecting groove of a predefined width that defines a thinned portion extending along a longitudinal axis of the strap to the free end;

a locking head secured to the first end of the strap, the locking head including an end wall, an inner wall and side walls that define a strap accepting channel in the head, the strap accepting channel having a strap entry end, a strap exit end, and a channel width $W_1$ defined between the end wall and the inner wall;

a support guide projecting from the inner wall of the locking head into the strap accepting channel and having a ledge surface extending in the width direction of the strap accepting channel, the support guide restricting the width of the strap accepting channel to a width $W_2$, which is less than $W_1$, the support guide having a width transverse to the width of the strap accepting channel that is less than the predefined width of the inwardly projecting groove of the strap; and a metal locking device having a mounted end fixed to a locking device slot of the end wall of the locking head and a free end positioned within the strap accepting channel, wherein the free end has a length L that is greater than $W_2$.

2. The cable tie of claim 1, wherein upon tightening of the cable tie, the metal locking device is capable of completely piercing the thinned portion of the strap.

3. The cable tie of claim 2, wherein upon full piercing of the strap, the metal locking device becomes supported at the fixed end and supported at the free end by the ledge surface.

4. The cable tie of claim 1, wherein the support guide and inwardly projecting groove mate to assist in centering of the strap in the strap accepting channel.

5. The cable tie of claim 4, wherein a leading edge of the support guide at the strap entry end of the strap accepting channel is convex.

6. The cable tie of claim 1, wherein the inwardly projecting groove increases in width near the first end of the strap.

7. The cable tie of claim 6, wherein the inwardly projecting groove tapers into a V-shape at the first end of the strap providing an increased reduced thickness area that increases flexibility of the strap at the first end.

8. The cable tie of claim 1, wherein the strap has a strap attachment axis and the strap accepting channel is parallel to this axis.

9. The cable tie of claim 8, wherein the first end of the strap is bent substantially perpendicular to the strap attachment axis.

10. The cable tie of claim 1, wherein the strap has a strap attachment axis and the strap accepting channel is perpendicular to this axis.

11. The cable tie of claim 1, wherein the length L is not more than $W_1$.

12. A method of bundling an object using the cable tie of claim 1, comprising the step of:

placing the cable tie around an object;

inserting the free end of the strap into the strap entry end of the strap accepting channel and beyond the free end of the metal locking device;

feeding the free end of the strap through the strap accepting channel until the cable tie is snug around the object.

13. The method of claim 12, further comprising a step of:

locking the cable tie in position by applying a removal force to the cable tie acting to pull the strap out of the strap entry end of the strap accepting channel that causes deflection of the free end of the metal locking device toward the strap entry end of the strap accepting channel so as to fully pierce the strap and rest the free end of the metal locking device against the ledge of the support guide.

14. A cable tie, comprising:

a strap including a first end and a free end, the strap having a central inwardly projecting groove of a predefined width that defines a thinned portion extending along a longitudinal axis of the strap to the free end;

a locking head secured to the first end of the strap along a strap axis S, the locking head including an end wall, an inner wall and side walls that define a strap accepting channel in the head, the strap accepting channel being parallel to axis S and having a strap entry end, a strap exit end, and a channel width $W_1$ defined between the end wall and the inner wall;

a support guide projecting from the inner wall of the locking head into the strap accepting channel and having a ledge surface extending in the width direction of the strap accepting channel, the support guide restricting the width of the strap accepting channel to a width $W_2$, which is less than $W_1$, the support guide having a width transverse to the width of the strap accepting channel that is less than the predefined width of the inwardly projecting groove of the strap; and a metal locking device having a mounted end fixed to a locking device slot of the end wall of the locking head and a free end positioned within the strap accepting channel, wherein the free end has a length L that is greater than $W_2$.

15. The cable tie of claim 14, wherein the length L is not more than $W_1$.

* * * * *

UNITED STATES PATENT AND TRADEMARK OFFICE
CERTIFICATE OF CORRECTION

PATENT NO. : 6,526,628 B1
DATED : March 4, 2003
INVENTOR(S) : Caveney et al.

It is certified that error appears in the above-identified patent and that said Letters Patent is hereby corrected as shown below:

<u>Title page,</u>
Item [74], *Attorney, Agent or Firm*: "Claney" should read -- Clancy --.

<u>Drawings,</u>
Sheet 4, Fig. 11, the reference numeral "10" should read -- 110 --.

<u>Column 1,</u>
Line 12, "filly" should read -- fully --.

<u>Column 2,</u>
Line 38, "provided" should read -- provide --.
Line 66, "cross-section" should read -- cross-sectional --.

<u>Column 3,</u>
Line 7, "feed" should read -- fed --.

<u>Column 4,</u>
Line 22, delete the "." after "is".
Line 28, the mathematical symbol "$\leqq$" should read -- $\leq$ --.

Signed and Sealed this

Third Day of February, 2004

JON W. DUDAS
*Acting Director of the United States Patent and Trademark Office*